(12) United States Patent
Minds et al.

(10) Patent No.: US 8,997,516 B2
(45) Date of Patent: Apr. 7, 2015

(54) APPARATUS FOR AIR CONDITIONING OR WATER PRODUCTION

(75) Inventors: Gunnar Minds, Højbjerg (DK); Søren Minds, Aarhus N (DK)

(73) Assignee: AC-Sun ApS, Horsens (DK)

(*) Notice: Subject to any disclaimer, the term of this patent is extended or adjusted under 35 U.S.C. 154(b) by 156 days.

(21) Appl. No.: 13/579,726

(22) PCT Filed: Feb. 17, 2011

(86) PCT No.: PCT/DK2011/050045
§ 371 (c)(1),
(2), (4) Date: Oct. 3, 2012

(87) PCT Pub. No.: WO2011/100974
PCT Pub. Date: Aug. 25, 2011

(65) Prior Publication Data
US 2013/0014529 A1    Jan. 17, 2013

(30) Foreign Application Priority Data
Feb. 17, 2010    (DK) .................................. 2010 70057

(51) Int. Cl.
F25D 9/00    (2006.01)
F25B 11/02   (2006.01)
F25B 9/00    (2006.01)
F25B 27/00   (2006.01)

(52) U.S. Cl.
CPC . *F25B 11/02* (2013.01); *F25B 9/00* (2013.01); *F25B 27/00* (2013.01); *Y02E 10/46* (2013.01); *Y02T 10/166* (2013.01)

(58) Field of Classification Search
CPC ............ F25B 9/06; F25B 11/02; F25B 27/00; F25B 29/003; F25B 2309/005; F25B 2400/071
USPC .......... 62/238.1, 501, 401, 235.1, 238.4, 402, 62/87, 508, 469, 238, 430, 505
See application file for complete search history.

(56) References Cited

U.S. PATENT DOCUMENTS

| | | | |
|---|---|---|---|
| 2,394,253 A * | 2/1946 | Nettel et al. | 60/781 |
| 4,086,072 A | 4/1978 | Shaw | |
| 6,581,384 B1 | 6/2003 | Benson | |
| 6,606,860 B2 * | 8/2003 | McFarland | 60/648 |
| 2007/0051126 A1 * | 3/2007 | Okuda et al. | 62/402 |
| 2009/0266096 A1 * | 10/2009 | Minds et al. | 62/235.1 |
| 2009/0294097 A1 * | 12/2009 | Rini et al. | 165/63 |
| 2014/0075970 A1 * | 3/2014 | Benson | 62/79 |

FOREIGN PATENT DOCUMENTS

| | | |
|---|---|---|
| CN | 1407297 A | 4/2003 |
| CN | 1451919 A | 10/2003 |
| WO | 2007/038921 A1 | 4/2007 |

* cited by examiner

*Primary Examiner* — Cheryl J Tyler
*Assistant Examiner* — Melanie Phero
(74) *Attorney, Agent, or Firm* — Roberts Mlotkowski Safran & Cole, P.C.; David S. Safran

(57) ABSTRACT

The apparatus has a cooling arrangement with an expander/compressor system, condenser and evaporator primarily for air conditioning. An external heat source is provided for transfer of heat to the expander housing. For example, this heating medium is an electrical heat source in thermal contact with the outer side of the expander housing. Alternatively, the expander is provided inside an externally heated liquid buffer tank.

15 Claims, 11 Drawing Sheets

APPARATUS FOR AIR CONDITIONING OR WATER PRODUCTION

BACKGROUND OF THE INVENTION

1. Field of the Invention

The invention relates to an apparatus for cooling, typical air-conditioning, with an arrangement comprising interconnected expander, compressor, condenser, and evaporator in connection with an external heating source, for example a solar panel.

The number of air conditioning apparatuses is rapidly increasing. Having regard to the world wide aim of reduction of carbon dioxide emission, a reduction of the energy consumption of such machines is of utmost importance.

2. Description of Related Art

Normally, the energy consumption for air conditioning is largest, when the sunshine is strong. Therefore, using solar energy for conversion to cooling of air is desirable. Especially, it is desirable to use common solar heating systems using water as working fluid.

A high performance system for air condition is disclosed in International Patent Application WO2007/038921 by the same inventors. Although this system has numerous advantages over the prior art, there is still an ongoing search for improvements with respect to efficiency. Other disclosures include U.S. Pat. No. 4,086,072 by Shaw and U.S. Pat. No. 6,581,384 by Benson.

SUMMARY OF THE INVENTION

It is therefore the object of the invention to provide an improvement over existing air condition systems fed with thermal energy, for example from a solar heater. Especially, it is the purpose to provide a system, which is improved with respect to start-up situations. It is a further object of the invention to provide a system that has further optimised energy efficiency.

This object is achieved with an apparatus for cooling as explained in the following. The apparatus comprises means, for example a pump, for transport of fluid, or rather means for driving fluid, through a heating cycle and an external heat source for heating the fluid in the heating cycle. The apparatus comprises an expander with an expander housing having an inner side facing expanding means, preferably a first expander turbine, inside the expander housing, and the expander housing has an opposite outer side. The expander has an expander inlet connected to the heating cycle for receiving fluid in a gas phase heated by the external heat source to drive the expander by expanding the fluid. Further, the apparatus comprises a compressor with a compressor housing having an inner side facing compressing means, preferably a first compressor turbine, inside the compressor housing, and the compressor housing has an opposite outer side. The compressor has a compressor inlet and a compressor outlet, the compressor being driven by the expander for compressing working fluid from a low pressure compressor inlet gas to a high pressure compressor outlet gas.

A condenser condenses the working fluid from the expander or the working fluid from the compressor or both by energy transfer in a heat exchanger to a second fluid of lower temperature. An evaporator evaporates the working fluid from the condenser by energy transfer from a third fluid in a further heat exchanger and for creating a desired cooling effect in the third fluid. The third fluid may be used for air conditioning.

In addition, an external heat source is provided for transfer of heat to the expander housing by thermal contact of a heating medium with the outer side of the expander housing. For example, this heating medium is an electrical heat source in thermal contact with the outer side of the expander housing.

Preferably, this heating medium is a fluid. For example, the expander is provided inside a liquid buffer tank, the tank containing liquid in thermal connection with the external heat source and in thermal contact with the outer side of the expander housing for transfer of heat to the expander housing.

By providing a heating medium, preferably a liquid buffer tank having a liquid in thermal contact with the expander housing, the expander is heated to a temperature suitable for the expansion process of the working fluid, such that a rapid temperature drop of the working fluid in the expander due to a cold housing is prevented. Such a temperature drop due to a cold expander housing is especially a risk during the startup phase and is highly critical, since the temperature drop may cause condensation of the working fluid in the expander, which can damage the expander, for example the turbine blades.

As mentioned, the preferred expander is a turbine expander, for example with a radial or axial turbine. Also, the preferred compressor is a turbine compressor, for example with a radial or axial turbine. Although, the principle is especially useful for turbine expanders and/or turbine compressors, the heating medium, for example the liquid in a buffer tank may also be advantageously applied in systems as described above even when using other, more conventional types of expanders and/or compressors.

In order to also provide a likewise heating of the compressor, optionally, also the compressor may be provided with a likewise heating medium, for example electrical heater on the outer side of the compressor housing. Especially, the compressor may be inside the liquid buffer tank with the liquid being in thermal contact with the outer side of the compressor housing for transfer of heat to the compressor housing.

In a further embodiment, the apparatus further has a first heat exchanger provided inside the buffer tank in thermal contact with the liquid in the buffer tank and with a fluid connection to the expander inlet for providing heat from the liquid in the buffer tank to the fluid in the heating cycle. This first heat exchanger assures that not only the housing of the expander but also the fluid that enters the expander may be pre-heated to the same temperature before startup. The liquid buffer tank, thus, provides a thermal stabilizing system for a smooth running of the apparatus.

In an even further embodiment, the first heat exchanger also has a fluid connection to the compressor outlet for transfer of heat from the high pressure compressor outlet fluid to the fluid in the heating cycle upstream of the expander inlet. Preferably, there is no mixing between the compressor outlet fluid and the expander inlet fluid.

According to the invention, heat is transferred to the fluid before entering the expander. Thus, fluid may be heated to a first temperature by the liquid in the buffer tank, especially for startup situations, and heated to a second, even higher temperature in this first heat exchanger. Part of the excess heat may in addition be transferred to the liquid in the liquid buffer tank. This arrangement implies more moderate requirements to the heating capabilities of the external heating source.

For example, the first heating source may be a solar heater that heats and evaporates the fluid in the fluid cycle to a temperature in the order of 100° C. and a pressure of 1 bar. After the external heater, the fluid may still be—at least partly—in the liquid phase and may then have its temperature increased in the first heat exchanger in order to achieve a gas phase before entering the expander.

The external heating source may provide a temperature to the fluid in the fluid cycle around 100° C., or lower or higher, for example between 70° C. and 120° C. or between 90° C. and 110° C., which makes the system suited for solar heaters and other facilities with rather low temperature. For example, waste water from central heating plants or from industrial plants may be used.

The heat exchanger may also be a solar panel based on a parabolic solar collector or other waste heat producing a high fluid temperature up to 500° C. The high temperature from the parabolic solar collector may be heat changed to reach optimal inlet conditions to the expander.

In addition, the apparatus according to the invention is suited for water as the working fluid, which is a simplifying factor.

As a further alternative or in addition to other heating sources, the external heat source may comprises an electrical heater that is connected to the first heat exchanger for heating the fluid in the heating cycle upstream of the expander inlet. The value of such an electric heater in this case is especially important in the start up phase, where the working fluid into the expander inlet has to be in gas form. An electric heater may also be used, especially in the start up phase, for heating the liquid in the liquid tank.

In a further embodiment, the expander turbine is a first expander turbine and the compressor turbine is a first compressor turbine, and the first expander turbine is mechanically connected to the first compressor turbine, for example by having a common axle, for driving the first compressor turbine synchronous with the first expander turbine.

The system can be expanded by more than one of such expander/compressor pairs. Therefore, in a further embodiment, the apparatus comprises at least one further expander and at least one further compressor with a second expander turbine and second compressor turbine, respectively. The second turbines are mechanically connected for mutually synchronous rotation thereof independently of the rotation of the first expander and compressor turbines.

Thus, in case of two serially connected expanders (an upstream expander and a downstream expander) and two serially connected compressors (an upstream compressor and a downstream compressor), there is a pair-wise connection through the respective turbine axles, such that the two high-pressure turbines from the upstream expander and the downstream compressor, respectively, are connected, and the low-pressure turbines from the downstream expander and upstream compressor, respectively, are connected.

In one embodiment, the expander outlet has an expander fluid connection to the inlet of the further expander, and the outlet of the further compressor has a compressor fluid connection to the inlet of the compressor. Thus, the two or more expanders are serially connected as are the two or more compressors.

In an embodiment, the expander has a first expander stage and a second expander stage, and optionally even further stages, and there is provided heating means for transfer of heat to the gaseous fluid between the different expander stages. This may be used to increase the efficiency of the expanders.

The two-stage expander (or expander series with even more stages) is used for reduction of the risk for wet expansion. The double compression results in sufficient outlet pressure for condensation even under tropical conditions.

However, a serial connection is not necessary. Pairs of expander/compressor arrangements can also work in parallel inside the buffer tank.

In a further embodiment, fluid from the expander and fluid from the compressor are mixed though a valve, preferably a pressure reduction valve. Advantageously, the mixing is performed before the expander fluid enters the condenser and after the compressor fluid has passed the condenser. Thus, the mixing valve is provided with a connection to the expander fluid upstream of the condenser and with a connection to the compressor fluid downstream of the condenser.

However, preferably, the fluid cycles for the expander and the compressor are separate. In addition, the condenser for the expander working fluid in the heating cycle need not be the same as the condenser for the working fluid from the compressor. For example, the apparatus includes a first condenser for condensing the working fluid from the expander outlet and a second condenser for condensing the working fluid from the compressor outlet.

In a further embodiment, the apparatus comprises a further evaporator for evaporating working fluid before it enters a compressor. The further evaporator has a fluid connection to the compressor fluid connection for adding the fluid from the further evaporator to the fluid from the compressor outlet. Thus, the evaporated fluid enters between two serially connected compressors.

Optionally, the heating cycle has a first fluid connection to the liquid in the fuel tank for receiving working fluid from the liquid in the liquid tank upstream of the expander inlet. Thus, the liquid in the tank are part of the working liquid.

For example, the heating cycle comprises a second fluid connection to the liquid tank downstream of the expander outlet for delivering working fluid back to the liquid in the liquid tank. As a further improvement, optionally, the heating cycle comprises a further heat exchanger outside the liquid tank, the heat exchanger being—on the one side—connected to the fuel tank via the second fluid connection, and the heat exchanger having—on the other side—a further fluid connection to the compressor outlet for heat transfer from the working fluid from the compressor outlet to the working fluid of the heating cycle before it re-enters the liquid tank. If the fluid cycle for the expander(s) is decoupled from a fluid cycle for the compressor(s), the further heat exchanger can be provided downstream of the first condenser and upstream of the second condenser. It has turned out surprisingly that this arrangement yields a benefit of 4-8% more cooling capacity relative to the input heat.

In a further embodiment, the external heat source comprises a solar heating panel with a fluid connection to the liquid tank for providing the heated liquid from the solar panel to the tank. Alternatively, the solar panel fluid does not mix with the liquid in the liquid buffer tank but has a liquid connection to a heat exchanger inside the liquid tank for transfer of heat from the fluid of the solar heating panel to the liquid in the liquid tank only through the heat exchanger.

Optionally, the external heat source comprises a combustion engine, from which heat is supplied directly or via a mechanical and/or electrical intermediate means. For example, the rest heat from the engine and/or the exhaust gas of the engine is used for heating.

In a special embodiment, the combustion engine is a motor as part of a vehicle and connected to the propulsion means of the vehicle.

For example, the apparatus is combined with such a vehicle. The expander comprises a turbine connected to a generator for driving the generator to produce electrical power. The generator produces electrical power and is electrically connected to an electrical motor for driving the motor by the electrical power produced by the generator. The motor in turn may be used for various means, for example to assist the propulsion of the vehicle. In a wheeled vehicle, for example, the exhaust gas may be used for providing power to an electrical motor, which provides additional power of the wheels. In a ship, it may be used for additional power to the screw or water turbine, and in an airplane for providing additional power to the propeller.

Generally, the apparatus may be used for producing electricity, if the axles of the expander and or compressor are connected to a generator. For example, the electrical power produced therefrom can be used for driving an electrical motor.

As a further example, the heat from a combustion engine in a vehicle may be used to drive the apparatus in order to provide electrical power in a generator connected to the expander and/or compressor axle. In return, the motor may be used to assist the driving of the wheels of the vehicle.

Thus, heat energy from the engine and heat as well as kinetic energy from the exhaust gas, which is usually a waste product of a vehicle, can be recovered to reduce the fuel consumption of the vehicle.

Also, the axles from the expanders and/or compressors may be connected to motors for driving the axles.

In a system according to the invention, the pressure can be kept below 2 atmospheres, or rather be 1.5 atmospheres at maximum.

Preferably, the expander is a turbine expander, for example with a rotational speed of between 50,000 and 250,000 rpm. A motor, preferably electrical, may be used for additional driving of the expander and the compressor or used as a generator to make electricity ex. power for the electrical components on a self-contained unit.

The preferred working fluid is water, however, other working fluids may be used, for example, comprising isobutane, butane, ammonia, oil, Aspen Temper-20, Aspen Temper-40, Aspen Temper-55, calcium chloride, Dowtherm J, Dowtherm Q, ethanol, ethylene glycol, Freezium, magnesium chloride, calcium chloride, methanol, potassium carbonate, propylene glycol, sodium chloride, Syltherm XLT, Theimogen VP1869, Tyxofit, $N_2$, $CO_2$, coolant comprising HCFC, CFC or HC, R134a or R407 or combinations thereof.

The cooling power of an apparatus according to the invention may vary over a large span, for example, it may have 10, 20 up till 50 kW.

When water is the refrigerant, the evaporation process in the apparatus according to the invention produces distilled water. This distilled water can be used to spray the condensers to make the energy transportation more efficient giving a higher COP.

The expander and/or the compressor may be of the axial or radial type of turbine or of a type combining the two principles.

The apparatus according to the invention may not only be used for cooling, for example, air conditioning, but can also be used for providing distilled water, for example, used to humidify the air to the condenser or as drinking water.

The invention will be explained in more detail with reference to the accompanying drawings.

DETAILED DESCRIPTION OF THE INVENTION

Figure 1:
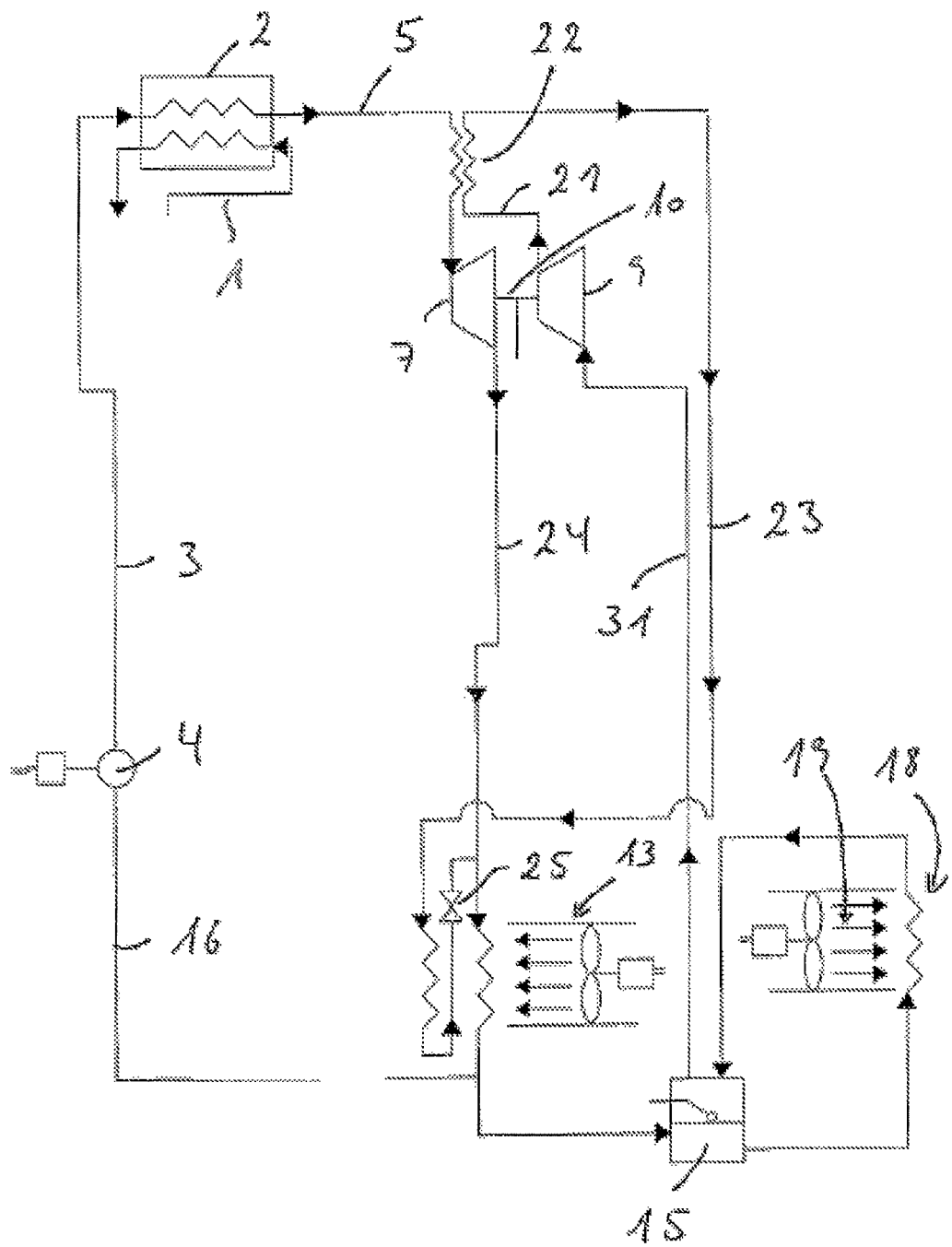
FIG. 1 is a diagram of a prior art system of International Patent Application WO2007/038912.

FIG. 1 illustrates a prior art system as disclosed in International Patent Application WO2007/038912. The system and the cycles are explained in detail in the following, as it eases the understanding of the invention later.

A heat source 1, such as a solar heater or waste water from a heating plant, provides thermal energy that is transferred to a working fluid, preferably water, in a heat exchanger 2. The working fluid is provided in tube 3, for example under atmospheric pressure, from a liquid pump 4. The relatively low pressure of an atmosphere makes the system useful for solar heaters. By receiving thermal energy in the heat exchanger 2, the pressurized liquid is heated, for example to 100° C. The heated liquid is led by tube 5 into expander 7, where the liquid is expanded and transfers work from the working fluid into the expander 7. The expander 7 may be a turbine expander running at a speed of 160.000 rpm.

Having received energy from the working fluid, the expander 7 is driving a turbine compressor 9 connected to the expander by a shaft 10. The compressor 9 compresses the working fluid from a gaseous state to an intermediate pressure gas as part of a typical refrigeration cycle. The output fluid from the compressor 9 flows through tube 21 in to a first heat exchanger 22, where thermal energy is transferred from the compressor outlet fluid to the fluid flowing through tube 5 from the heat exchanger 2.

With water as a working fluid, the temperature at the compressor 9 outlet is typically 200° C., and the temperature of a solar heat exchanger 2 is around 100° C., which assures a pronounced energy transfer from the compressor 9 fluid to the heat fluid from the solar heat exchanger 2. This heat transfer is the main reason for a high cooling performance of the system.

The working fluid from the compressor 9 in conduit 23 after the first heat exchanger 22 and the working fluid from the expander 7 in conduit 24 are cooled in condenser 13 by ambient air before mixing through a valve 25 that takes into account possible differences in the pressure. The mixed working fluid is split into a first part that is recycled into tube 16 and into a second part which is used for evaporation in evaporator 18. Evaporator 18 is driven by compressor 9 sucking gas from evaporator 18 through tank 15. The evaporated and thereby cooled gas in evaporator 18 is used to cool an air flow 19, for example for air conditioning in a house.

This prior art system has the advantage to work efficiently even with an external heater at a low temperature of 100° C. or less. Further advantages and further embodiments are explained in International Patent Application WO2007/038912.

Figure 2:
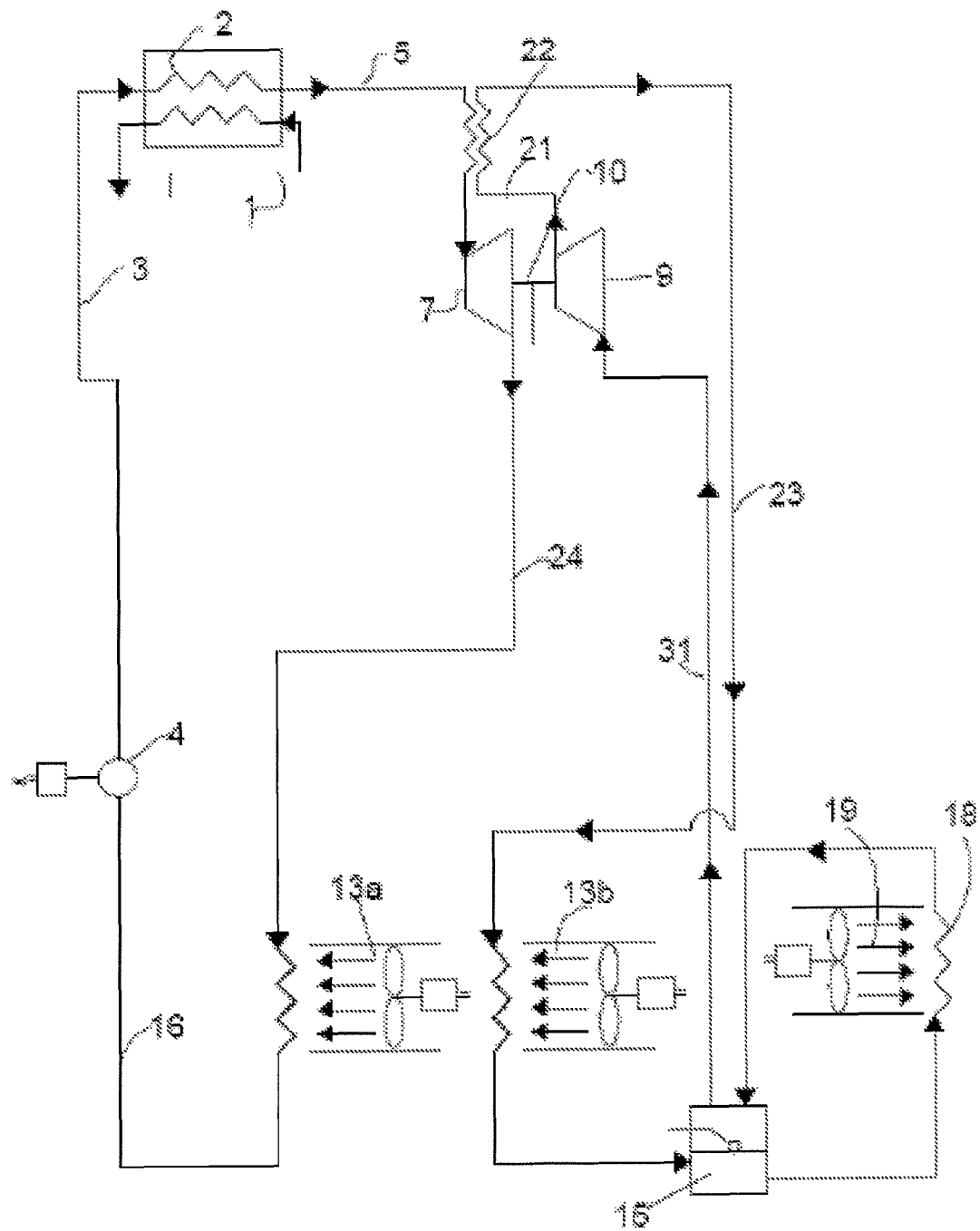
FIG. 2 shows an alternative embodiment, with separate condensers respectively for the expander and compressor cycles.

A further slightly amended embodiment in line with the prior art system of FIG. 1 is illustrated in FIG. 2. Whereas in FIG. 1, the working fluid from the expander 7 in conduit 24 is combined through a valve 25 with the working fluid from the compressor 9 in line 23, this is not so in FIG. 2. In FIG. 2, the working fluid cycles for the expander 7 and the compressor 9, respectively, are separate. Thus, there is one cycle 24, 16, 3, 5 for the expander, and one cycle 21, 23, 31 for the compressor 9. It is still possible to use a single fan for the heat exchanger with the condenser 13, however, there is also the possibility of using two separate condensers 13a, 13b with individual fans, as illustrated in FIG. 2, where one condenser 13a is used for the expander fluid cycle 24, 16, 3, 5 and another condenser 13b is used for the compressor fluid cycle 21, 23, 31.

This embodiment may be defined in more general terms as an apparatus for cooling, comprising a liquid pump 4 for transport of fluid through a heating cycle 5, 7, 24, 16, 4, 3, an external heat source 1, 2 for heating the fluid in the heating cycle 5, 7, 24, 16, 4, 3, an expander 7 with an expander inlet and an expander outlet, the expander inlet having a fluid connection 5 to the external heat source 1, 2 for receiving fluid in the gas phase to drive the expander 7 by expanding the fluid, a compressor 9 with a compressor inlet and a compressor outlet, the compressor being driven by the expander 7 for compressing working fluid from a low pressure compressor inlet gas to a high pressure compressor outlet gas, a first heat exchanger 22 with a fluid connection 21 to the compressor outlet and connected to the expander inlet for transfer of heat from the high pressure compressor outlet gas to the fluid in the heating cycle, a condenser 13a, 13b for condensing the working fluid from the compressor 9 or the expander or both by energy transfer to a second fluid of lower temperature, an evaporator 18 for evaporating the working fluid from the condenser 13a, 13b by energy transfer from a third fluid 19 and for creating a desired cooling effect in the third fluid 19, wherein the first heat exchanger 22 is connected to the heating cycle between the external heat source 1, 2 and the expander 7 inlet.

In addition, optionally, as illustrated, the system may comprise one condenser 13b for the fluid from the compressor and a further condenser 13a for condensing the working fluid from the expander 7 by energy transfer to a further fluid of lower temperature, As has been found out by the inventors, the prior art system of the International Patent Application WO2007/038912 and the system of FIG. 2 may be improved, especially in start up situations, where the expander is cold, which may lead to condensation, which in worst case can be damaging for the high speed turbine. The improvement is a heating up of the turbine housing, typically metal housing, of the expander 7 and, optionally, also of the housing of the compressor 9. The heating up of the housing prevents condensation of the entering fluid into the turbine.

This heating up of the housing, in principle, may be performed in various ways, including electrical heating. This embodiment may be defined in more general terms as an apparatus for cooling, comprising a liquid pump 4 for transport of fluid through a heating cycle 5, 7, 24, 16, 4, 3, an external heat source 1, 2 for heating the fluid in the heating cycle 5, 7, 24, 16, 4, 3, an expander 7 with an expander inlet and an expander outlet, the expander inlet having a fluid connection 5 to the external heat source 1, 2 for receiving fluid in the gas phase to drive the expander 7 by expanding the fluid, a compressor 9 with a compressor inlet and a compressor outlet, the compressor being driven by the expander 7 for compressing working fluid from a low pressure compressor inlet gas to a high pressure compressor outlet gas, a first heat exchanger 22 with a fluid connection 21 to the compressor outlet and connected to the expander inlet for transfer of heat from the high pressure compressor outlet gas to the fluid in the heating cycle, a condenser 13a, 13b for condensing the working fluid from the compressor 9 or the expander or both by energy transfer to a second fluid of lower temperature, an evaporator 18 for evaporating the working fluid from the condenser 13a, 13b by energy transfer from a third fluid 19 and for creating a desired cooling effect in the third fluid 19, the first heat exchanger 22 being connected to the heating cycle between the external heat source 1, 2 and the expander 7 inlet, wherein the expander and/or the compressor has a housing which is heated by an external heating source, preferably an electrical heater in thermal contact with the housing.

Figure 3:
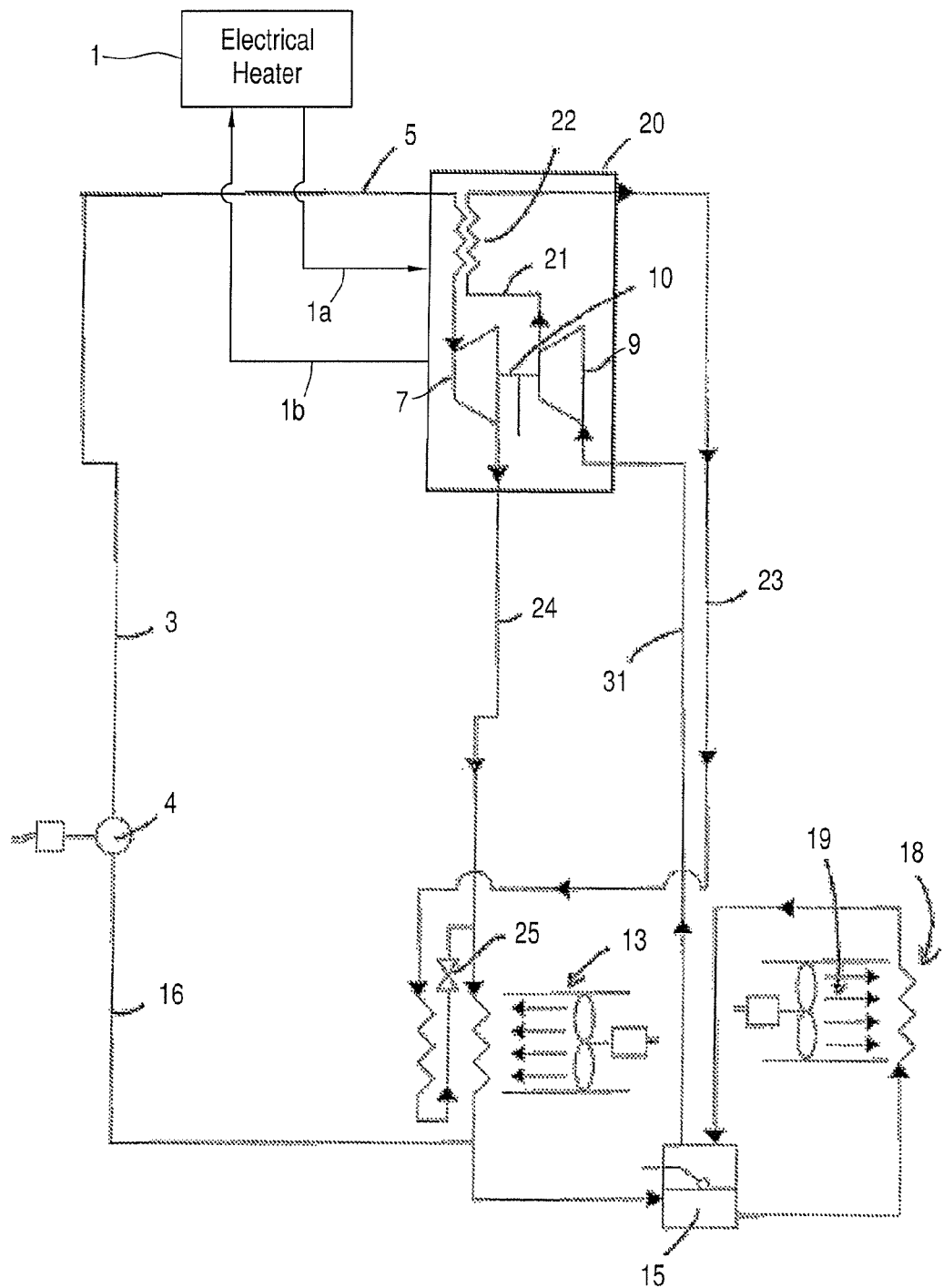
FIG. 3 illustrates a diagram similar to FIG. 1 but with a buffer tank around the compressor and expander according to the invention.

The preferred heating method will be explained with reference to FIG. 3 illustrating largely the same principle as in International Patent Application WO2007/038912. However, the heat source 1 is not heating the heat exchanger 2 of FIG. 1 but heating a liquid in a buffer tank 20 surrounding the compressor housing and the expander 7 housing. The heating of the compressor 9 housing is optional, but preferred. Optional, but preferred, is also the inclusion of first heat exchanger 22 in the tank. The liquid in the tank is in thermal contact with the housing of the expander 7 and, optionally and as illustrated, also with the housing of the compressor 9 and the heat exchanger 22. By having thermal contact with all three elements, an equal temperature of these is assured, which helps preventing condensation in start-up situations.

As a heat source, heated liquid is supplied to the buffer tank 20 through supply tube 1a and discharge tube 1b of the heat source 1. Alternatively, a heat exchanger (not shown but the principle of which is illustrated as 42 in FIG. 7) may be provided for heat transfer between liquid from the heat source and liquid inside the buffer tank 20. Examples of heat sources are solar heating panels and waste water supplies from central heating plants or from industrial plants. In addition or alternatively, also electrical heaters or other kind of heat sources may be used to heat up the liquid in the buffer tank. For example, in the morning when solar heating panels are still could and get gradually heated up, an electrical heating source may be used to heat the liquid in the buffer tank in order to assist an easy start up without risk for condensation in the expander.

Figure 10:
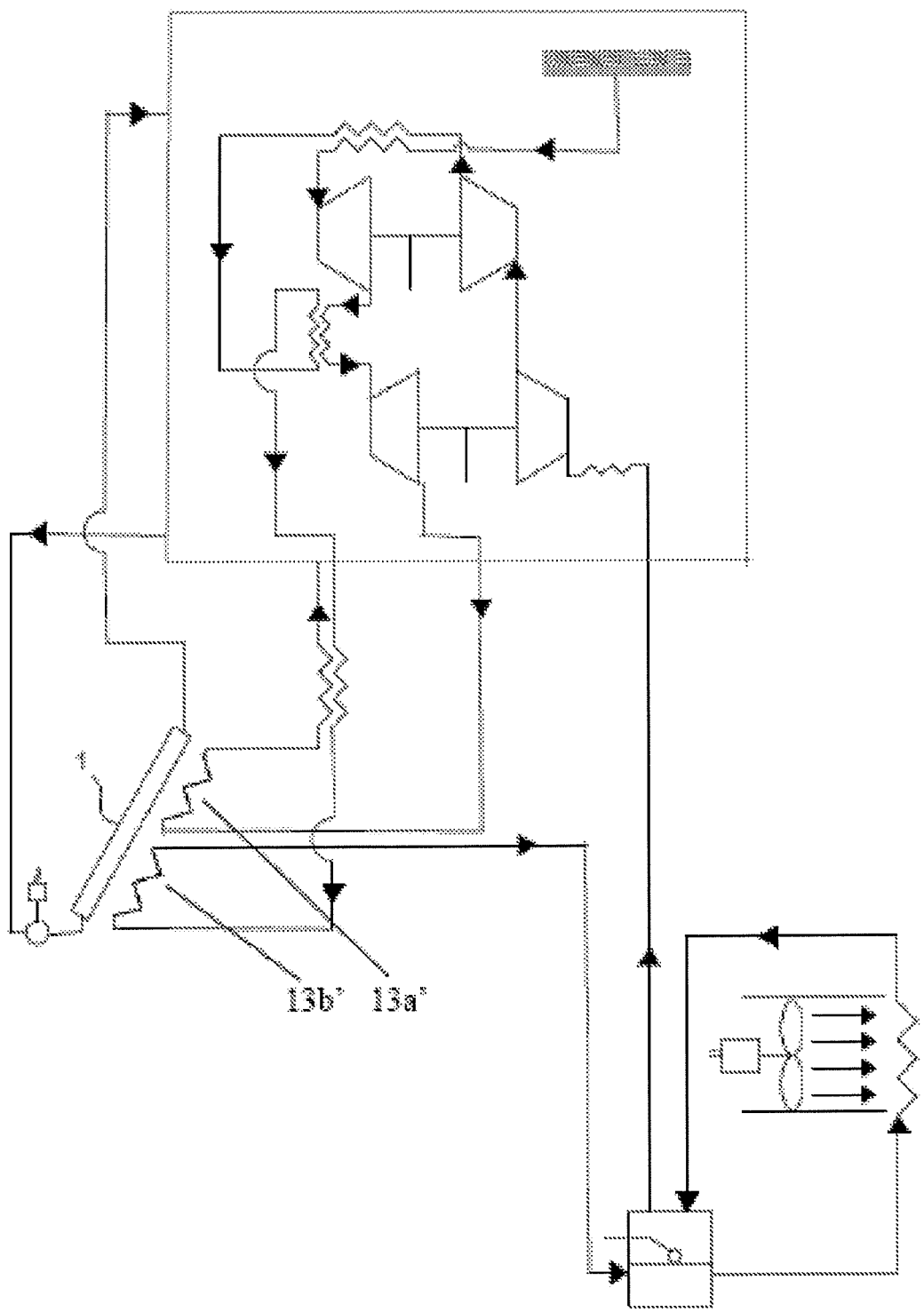

The principle of providing a liquid buffer tank 20 around the expander 7 and, optionally, the compressor 9, and further optionally, one or more of the heat exchangers connected to the expander 7 and the compressor 9, can also be applied to all the other embodiments that have been illustrated in International Patent Application WO2007/038912 including the distillated water production system illustrated in FIG. 10 of WO2007/038912. Such distillated water may be used for other purposes than the explained spraying system. It may also be used as part of a drinking water production system.

In addition, the principle can also be used in other prior art systems, especially the prior art systems discussed in the introduction of the International Patent Application WO2007/038912.

Figure 4:
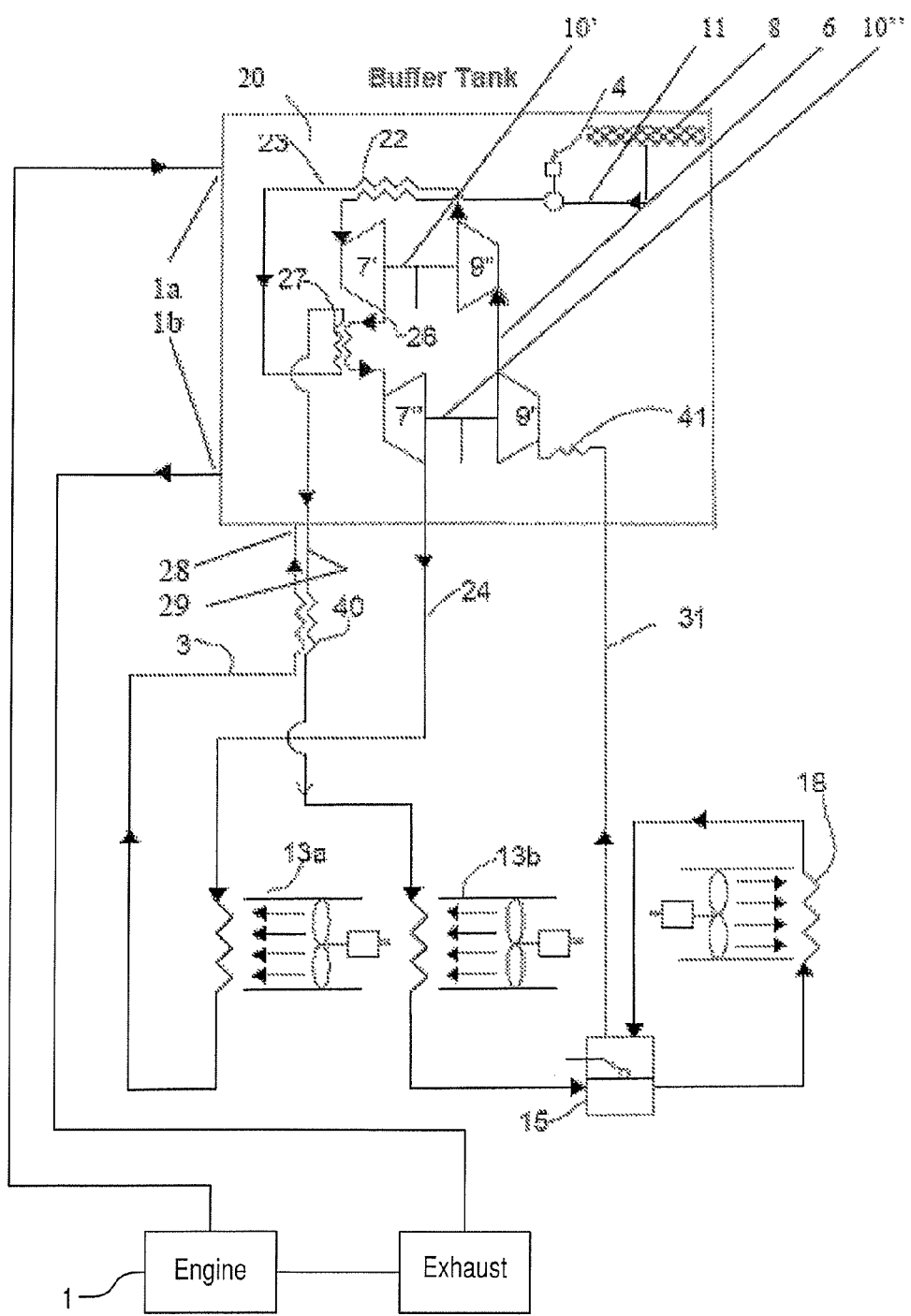
FIG. 4 shows a double-pair turbine system and internal heat exchangers inside a buffer tank.

FIG. 4 illustrates a further embodiment where the principle with two separated condensers 13a and 13b are used, although this is not essential for the buffer tank solution in this embodiment or the following embodiments, such that also the principle with a single condenser 13 as in FIG. 1 may be used.

The system in FIG. 4 has a buffer tank 2 around a system with two expanders 7', 7" and two compressors 9', 9"' and a number of heat exchangers 22, 27, 41. A first expander 7' and compressor 9"' pair is connected via a first rotation axle 10' for synchronous driving, and a second of expander 7" and compressor 9' pair is connected via a second rotation axle 10" for synchronous driving. The expander 7' is connected to the further expander 7" via tube 26 for fluid to flow from the first expander 7' to the further expander 7". A tube connection 6 is likewise provided between further compressor 9' and the compressor 9"'.

Heated liquid 1 is flowing through buffer tank 20 for heating of the system. Inside buffer tank 20, liquid is extracted as working fluid through intake system 8, for example a filter system, and transported through tube 11 to a pump 4, which is driving the working fluid through the expander cycle.

From the pump 4, working fluid is provided to the expander 7', after which the fluid enters tube 26 and heat exchanger 27, before it flows through the further expander 7", tube 24, condenser 13, tube 3 and heat exchanger 40 for again entering the buffer tank 20 through connection 28.

The buffer tank 20 also functions as a liquid separator, where working fluid enters the expander 7' from fluid intake 8 with minimized risk for droplets in the heat exchangers 22 and 27.

The separate compressor cycle for working fluid is a closed cycle and not in mixing connection with the expander cycle. In the compressor cycle, fluid is driven from the further compressor 9' through the compressor fluid connection 6 to the compressor 9"', after which heat therefrom is transferred to the expander fluid in the first heat exchanger 22, which also may transfer heat to the liquid in the buffer tank 20. A purpose of heat exchanger 22 is also explained in connection with the prior art system in FIG. 1. After heat exchanger 22, the working fluid in the compressor cycle is transported through tube 23 and into heat exchanger 27, which is thermally communicating with the fluid between the two expanders 7', 7". The compressor fluid exits the buffer tank through connection 29 and flows through heat exchanger 40, condenser 13b, tube 31, and heat exchanger 41 into the further compressor.

Heat exchanger 41 prevents droplets to enter the further compressor 9' in order to optimize the efficiency of the apparatus. The effect of heat exchanger 41 is in addition a higher temperature of the outlet fluid from the compressor 9"', which increases the efficiency of the heat exchangers 22 and 27.

The heat exchanger 40 reheats the working fluid in tube 3 of the expander cycle before the inlet 28 to the buffer tank 20 by using the rest-heat left over in the compressor cycle after heat exchanger 27. This raises the COP surprisingly with 8-12%. Heat exchanger 41 in line 31 is specifically used in the startup procedure by using the immediate heat in the buffer tank 20 to overheat the steam before entering the compressor 9'. However, heat exchanger 41 is also used in normal operation for recovering energy for the working fluid cycle.

Figure 5:
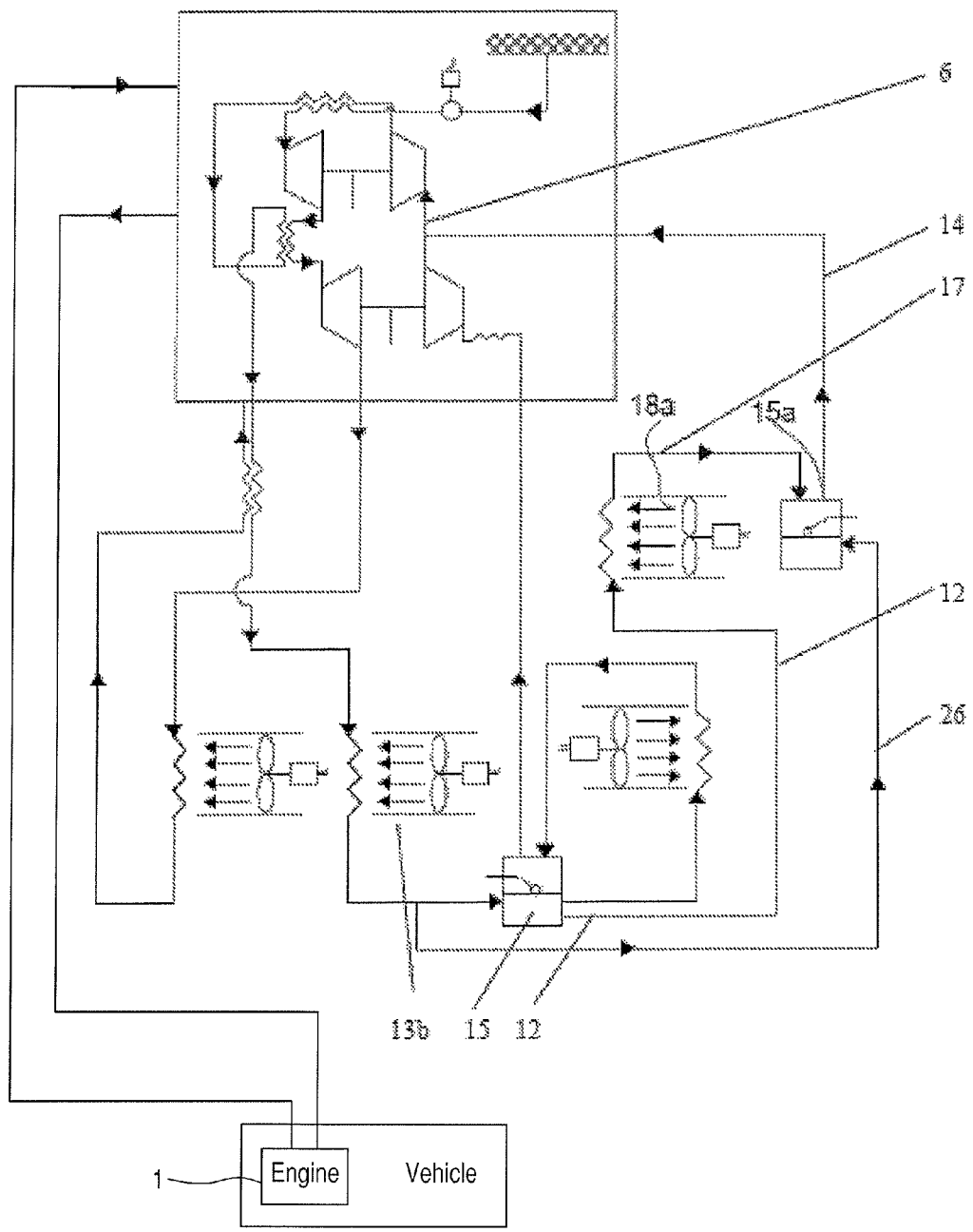
FIG. 5 illustrates an even further embodiment using an extra cooling cycle connected to the pipe between two compressors

FIG. 5 is largely identical to FIG. 4 apart from an additional cooling cycle 18a connected via tube 12 to the condensed water from separator 15 after condenser 13b in the compressor fluid cycle. The fluid from tube 12, condenser 18a, and tube 17 evaporates in separator 15A and is led through tube 14 for mixing with the compressor fluid in the compressor fluid connection 6 between the two compressors 9', 9"'. Additional fluid is provided into the separator through tube 26.

Figure 6:
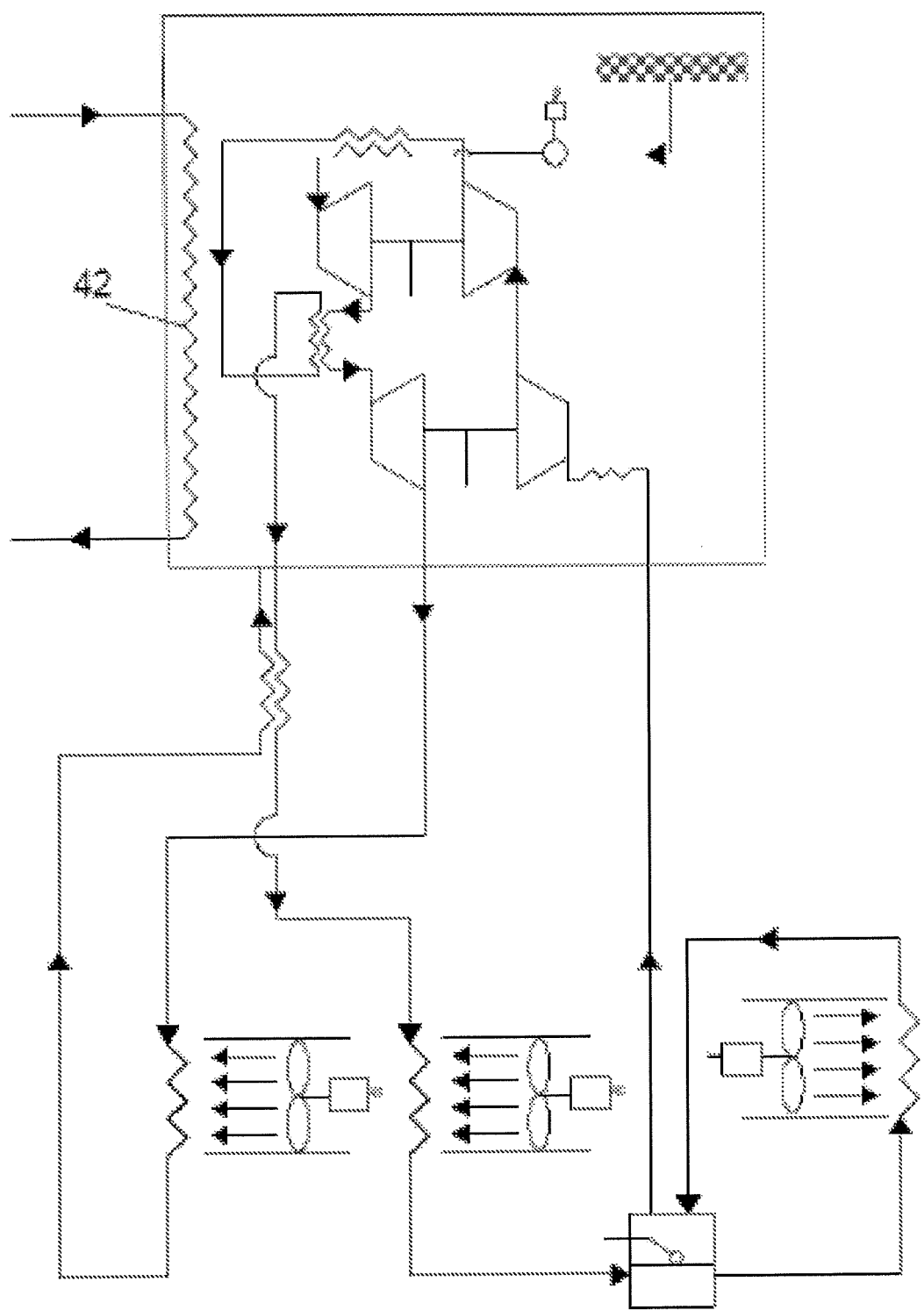
FIG. 6 illustrates a buffer tank heated by a heat exchanger connected to the external heat source.

The energy coming from the external heat source 1 can also be transported into the buffer tank using a heat exchanger 42, which is illustrated in FIG. 6, in order to decouple the expander fluid cycle and the fluid from the heat source.

Figure 7:
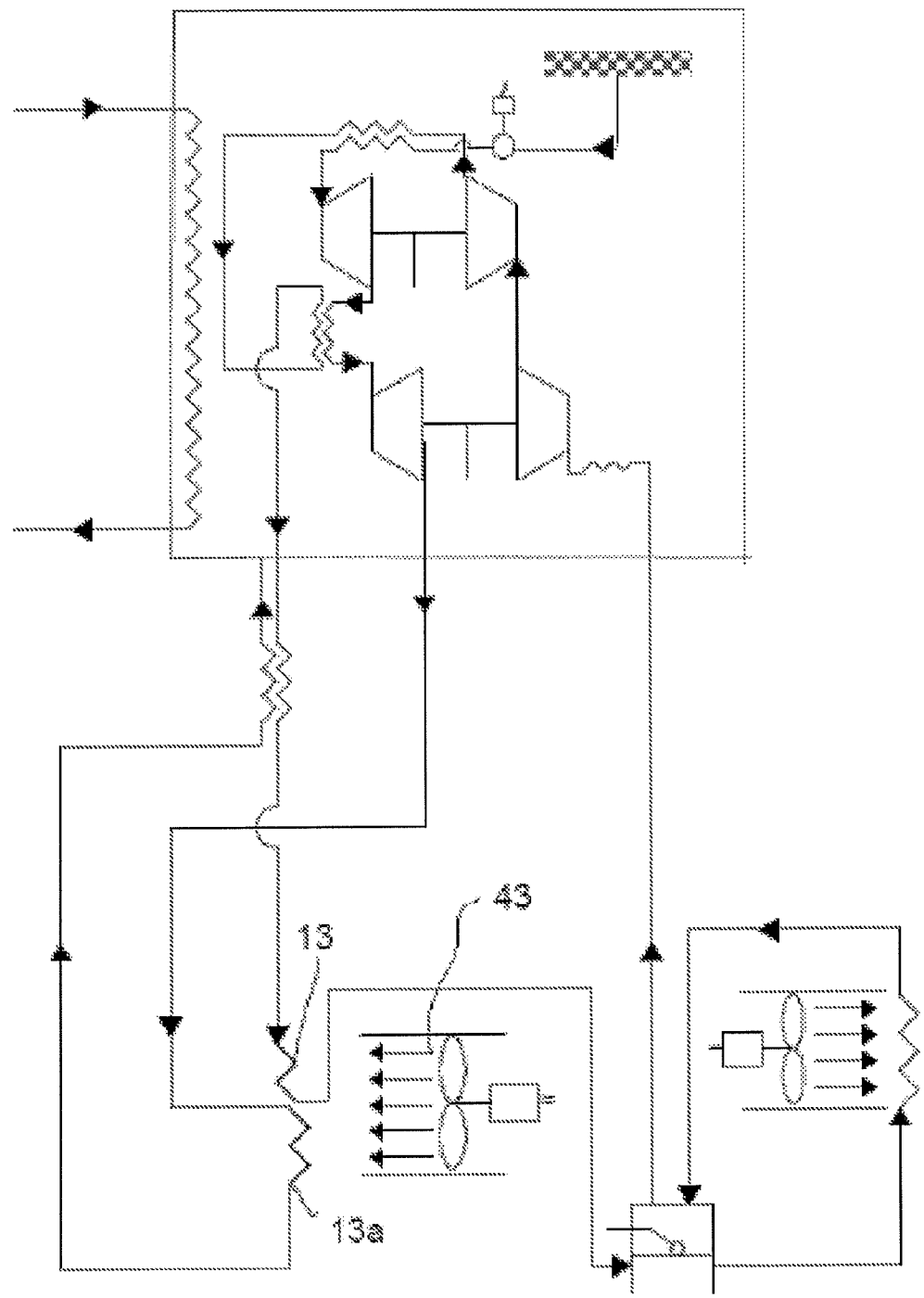
FIG. 7 shows separate condensers for the expander cycle and the compressor cycle but using a common cooling fan.

FIG. 7 is similar to the embodiment from FIG. 6 with separated condensers 13a and 13b for the respective expander and compressor cycles but using a common fan 43 to condensate the separate fluids.

Figure 8:
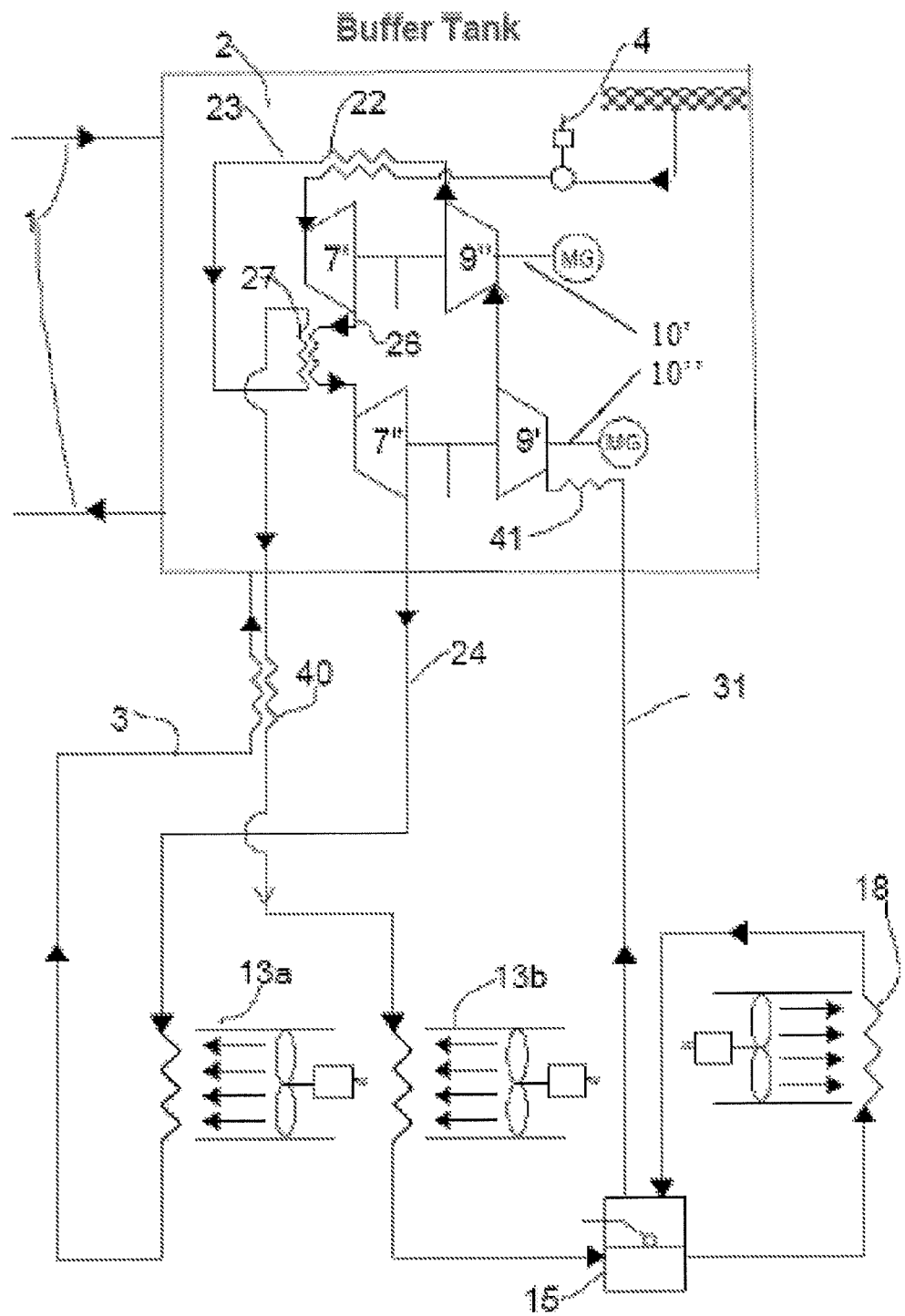
FIG. 8 shows a motor/generator MG running on the turbine axles.

FIG. 8 is similar to the embodiment of FIG. 4, however, with a motor/generator MG connected to the rotational axles 10', 10" of the first and second expander/compressor pairs. This gives the possibility to drive the axles actively by a motor and/or making electricity by a generator. The motor may be used in the start up procedure to rotate the axles for creating a higher temperature on the compressor turbine outlet steam and thereby heating the expander inlet flow for the turbine process to be active. The generator function making electricity can be used when the cooling capacity produced on the unit goes beyond necessities and/or to drive the electrical components as a self-contained unit.

Figure 9:
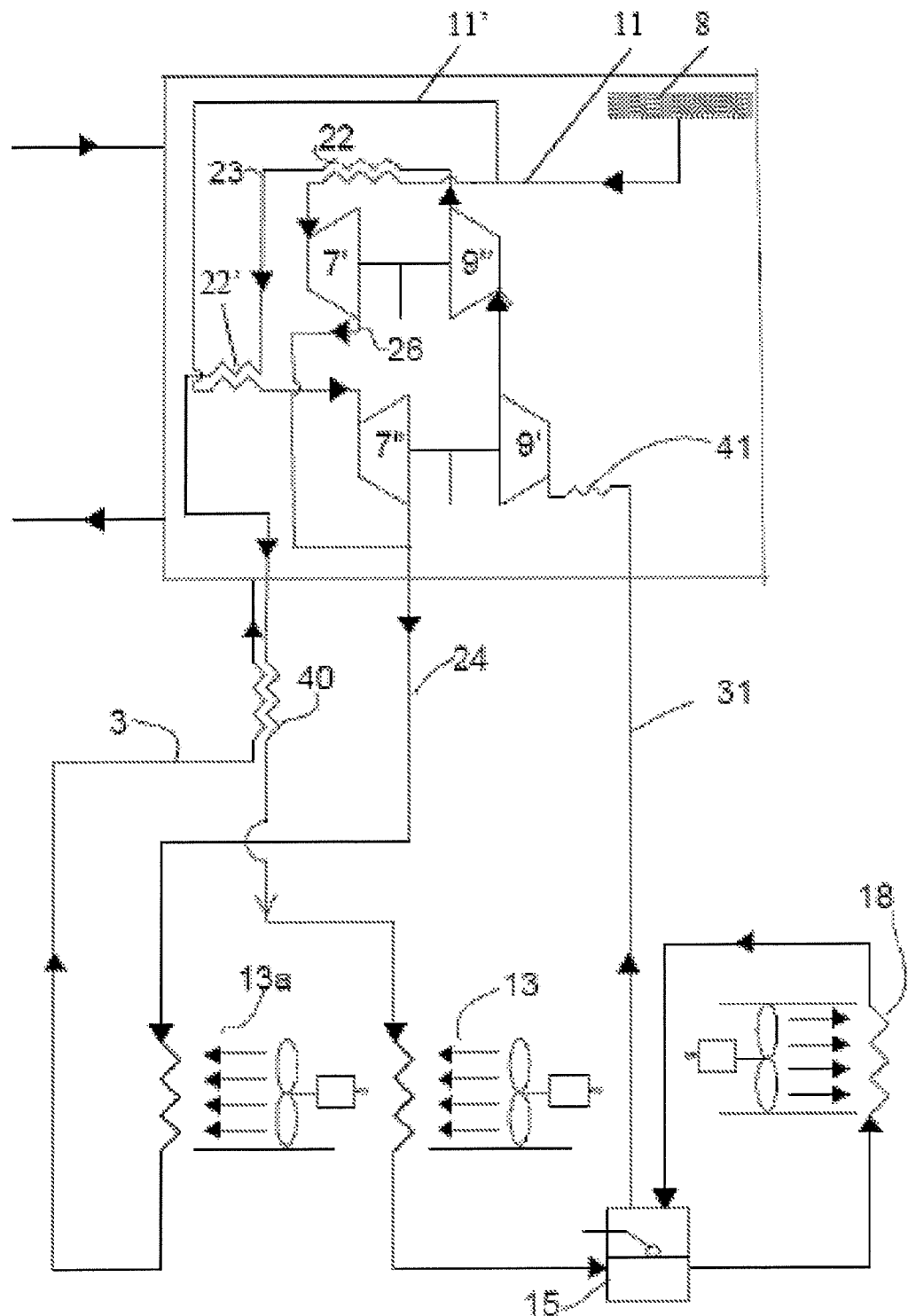
FIG. 9 illustrates an embodiment where expanders are run in parallel for exploitation of low-temperature-energy down to +55° C. in the buffer tank, FIG. 10 show condensers placed behind a solar collector for heat transfer to the solar panel.

FIG. 9 illustrates a system, where the expanders 7', 7" are not driven serially but in parallel. The expander 7" receives working fluid through heat exchanger 22 and tube 11 from the intake system 8, and the further expander 7"' receives fluid from the intake system 8 though an analogous tube 11' and an analogous heat exchanger 22' as illustrated. This gives the possibility for exploitation of low-temperature-energy down to +55° C. in the buffer tank. The outlet from the expanders 7, 7" are linked together in tube 24 and condenses further in condenser 13a.

FIG. 10 illustrates condensers 13a', 13b' placed behind a solar collector 1' for higher efficiency on the solar collector 1' and to minimize the electrical power consumption from any condenser fan. Natural air-flow transfers the heat from the condensers 13a', 13b' to the collector 1' by convection.

Figure 11:
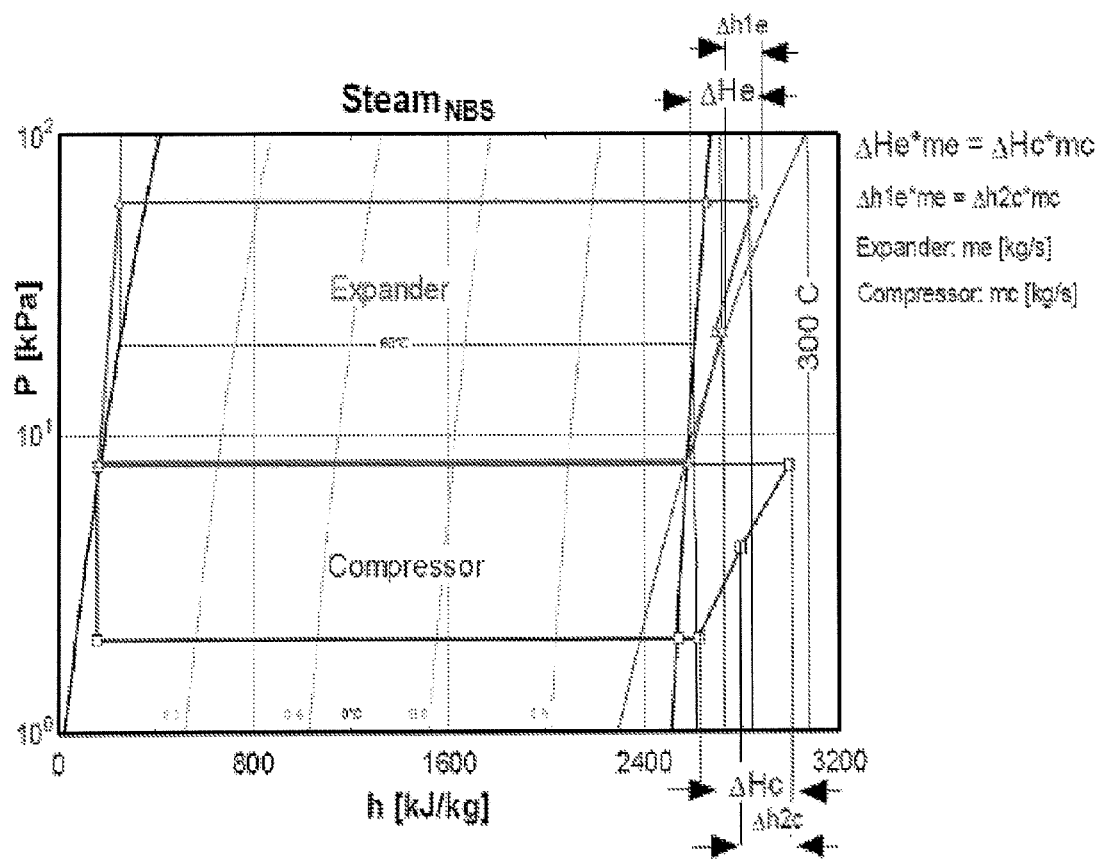
FIG. 11 illustrates a H/log P diagram alternative system of FIG. 4 with water (R718) as a working fluid.

FIG. 11 is an H/log P diagram illustrating the compressor and expander process with condensers, respectively, for the expander and the compressor cycle when using the rest-heat from the compressor cycle in the heat exchanger 40 transferred to the fluid in pipe 3 before the inlet to the buffer tank 20. The use of the remaining energy in the vapor from the compressors 9', 9"' after heat exchanger 22 and 27 results in a heating of the return fluid from the condenser 13a, 13b in heat exchanger 40. This increases the efficiency of the apparatus further and reduces the necessary energy requirements from the solar panel by 3-4%

What is claimed is:
1. An apparatus for cooling, comprising
means for transport of fluid through a heating cycle
an external heat source for heating the fluid in the heating cycle
an expander with an expander housing having an inner side facing a first expander turbine inside the expander housing, and the expander housing having an opposite outer side, the expander having an expander inlet connected to the heating cycle for receiving fluid in a gas phase heated by the external heat source to drive the expander by expanding the fluid, a compressor with a compressor housing having an inner side facing a first compressor turbine inside the compressor housing, and the compressor housing having an opposite outer side, the compressor having a compressor inlet and a compressor outlet, the compressor being driven by the expander for compressing working fluid from a low pressure compressor inlet gas to a high pressure compressor outlet gas, a condenser for condensing at least one of the working fluid from the expander and the fluid from the compressor by energy transfer in a heat exchanger to a second fluid of lower temperature, an evaporator for evaporating the working fluid from the condenser by energy transfer from a third fluid in a further heat exchanger and for creating a desired cooling effect in the third fluid, wherein the external heat source is provided in thermal connection with liquid in a liquid buffer tank, and wherein the expander is provided inside the liquid buffer tank for transferring of heat to the expander housing by thermal contact of the liquid with the outer side of the expander housing.

2. An apparatus according to claim 1, wherein also the compressor is provided inside the liquid buffer tank with the liquid being in thermal contact with the outer side of the compressor housing for transfer of heat to the compressor housing.

3. An apparatus according to claim 1, wherein the apparatus further has a first heat exchanger provided inside the buffer tank in thermal contact with the liquid in the buffer tank and with a fluid connection to the expander inlet for providing heat from the liquid in the buffer tank to the fluid in the heating cycle.

4. An apparatus according to claim 3, wherein first heat exchanger also has a fluid connection to the compressor outlet for transfer of heat from the high pressure compressor outlet gas to the fluid in the heating cycle.

5. An apparatus according to claim 4, wherein an external heat source comprises an electrical heater connected to the first heat exchanger for heating the fluid in the heating cycle upstream of the expander inlet.

6. An apparatus according to claim 1, wherein the expander turbine is a first expander turbine and the compressor turbine is a first compressor turbine, and wherein the first expander turbine is mechanically connected to the first compressor turbine for driving the first compressor turbine synchronous with the first expander turbine.

7. An apparatus according to claim 6, wherein the apparatus comprises a further expander and a further compressor with a second expander turbine and second compressor turbine, respectively, the second turbines being mechanically connected for mutually synchronous rotation thereof independently of the rotation of the first expander and compressor turbines, wherein the first expander has an outlet with an expander fluid connection to an inlet of the further expander, and an outlet of the further compressor has a compressor fluid connection to the inlet of the compressor.

8. An apparatus according to claim 7, comprising a further evaporator for evaporating working fluid before it enters the first compressor, wherein the further evaporator has a fluid connection to the compressor fluid connection for adding the fluid from the further evaporator to the fluid from the outlet of the further compressor.

9. An apparatus according to claim 1, wherein the heating cycle has a first fluid connection to the liquid in the liquid buffer tank for receiving working fluid from the liquid in the liquid buffer tank upstream of the expander inlet.

10. An apparatus according to claim 9, wherein the heating cycle comprises a second fluid connection to the liquid buffer tank downstream of the expander outlet for delivering working fluid back to the liquid in the liquid buffer tank, wherein the heating cycle comprises a further heat exchanger outside the liquid buffer tank, the heat exchanger being—on the one side—connected to the liquid buffer tank via the second fluid connection, and the heat exchanger having—on the other side—a further fluid connection to the compressor outlet for heat transfer from the working fluid from the compressor outlet to the working fluid of the heating cycle before it re-enters the liquid buffer tank.

11. An apparatus according to claim 10, wherein the apparatus includes a first condenser for condensing the working fluid from the expander outlet and a second condenser for condensing the working fluid from the compressor outlet, wherein the further heat exchanger is provided downstream of the first condenser and upstream of the second condenser.

12. An apparatus according to claim 1, wherein the external heat source comprises a solar heating panel with a fluid connection to the liquid tank for providing the heated liquid from the solar panel to the tank or wherein the solar panel has a liquid connection to a heat exchanger inside the liquid tank for transfer of heat from the fluid of the solar heating panel to the liquid in the liquid tank.

13. An apparatus according to claim 1, wherein the external heat source comprises rest-heat from a combustion engine or heat from exhaust gas from a combustion engine or both.

14. An apparatus according to claim 13, wherein the combustion engine is a motor of a vehicle for propulsion of the vehicle.

15. An apparatus according to claim 14, wherein the expander comprises a turbine connected to a generator for driving the generator to produce electrical power, wherein the generator is electrically connected to an electrical motor for propulsion of the vehicle.

* * * * *